Dec. 22, 1931.     D. S. JACOBUS     1,837,713
FURNACE AND METHOD OF OPERATING THE SAME
Filed March 9, 1926
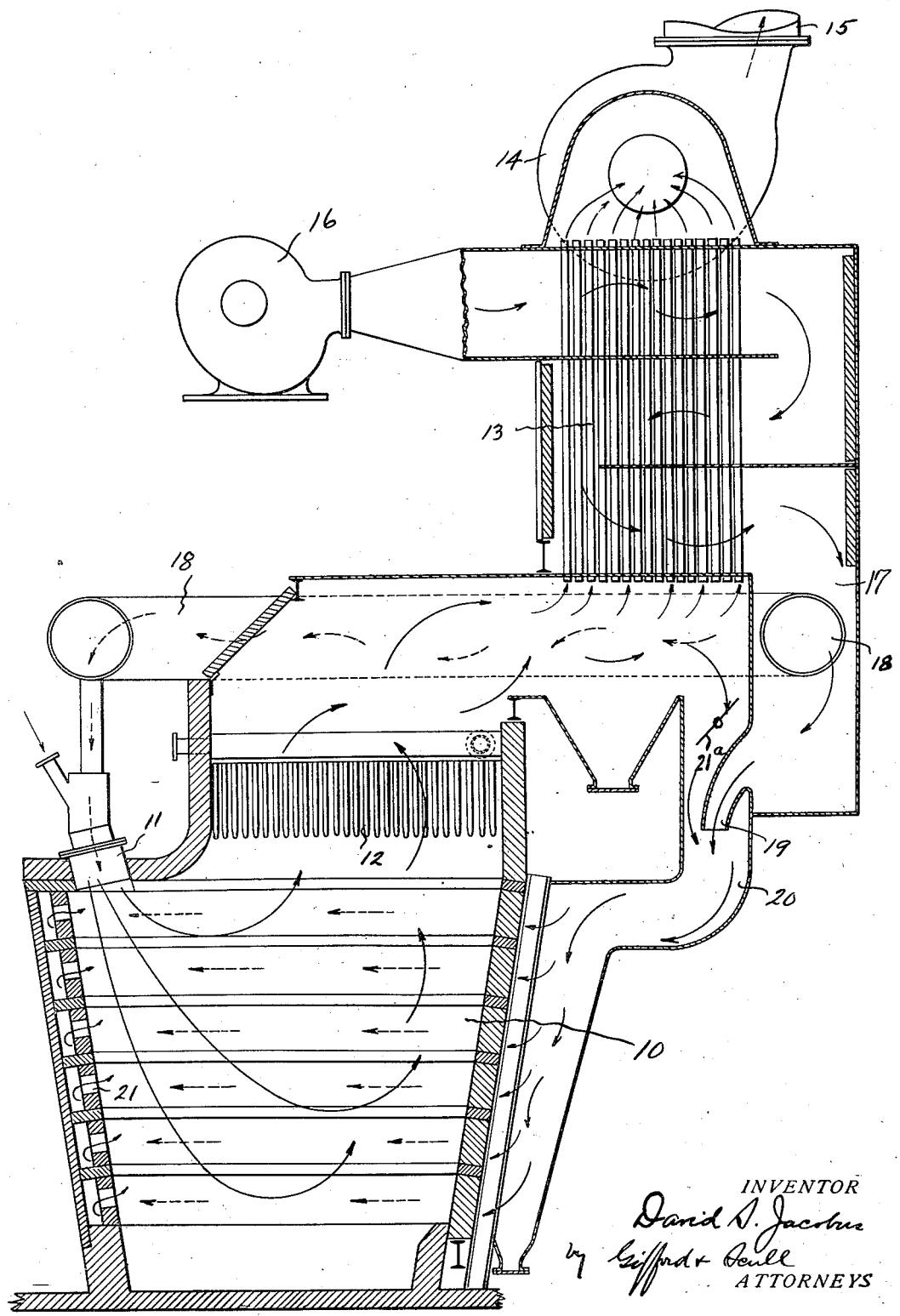
INVENTOR
David S. Jacobus
by Gifford & Scull
ATTORNEYS Patented Dec. 22, 1931

1,837,713

UNITED STATES PATENT OFFICE

DAVID S. JACOBUS, OF MONTCLAIR, NEW JERSEY, ASSIGNOR, BY MESNE ASSIGNMENTS, TO FULLER LEHIGH COMPANY, A CORPORATION OF DELAWARE

FURNACE AND METHOD OF OPERATING THE SAME

Application filed March 9, 1926. Serial No. 93,411.

My present invention relates to furnaces, particularly those used in heating fluids, in which it is desired to burn fuel at the highest efficiencies and, at the same time, limit the temperatures of the combustion gases, and will be best understood from the following description and the annexed drawing showing a vertical section, more or less diagrammatic, of a fluid heater and its furnace embodying my invention.

In the drawing, a furnace chamber 10 is provided with a powdered fuel burner 11 and the gases from the combustion chamber flow over the heating surface of a fluid heater 12 which may be, for instance, a mercury heater, an oil still, or any other fluid heater, in which it is undesirable to contact the heating surfaces with extremely high temperature furnace gases. It will be understood that the fluid heater which I have illustrated is more or less diagrammatic. After passing over the fluid heater 12, the combustion gases flow to and through the gas tubes 13 of an air heater, an induced draft fan 14 drawing these waste gases upwardly to the gas outlet 15.

Combustion air is forced by the fan 16 into the air heater in which it flows back and forth across the exterior of the tubes 13 and then downward into the duct 17. A horizontal duct 18 at either side of the furnace carries some of the air from the duct 17 directly to the fuel burner or burners 11. The remainder of the combustion air flows downward through the duct 17 and through the aspirator 19, the outlet of which is in a duct and mingling chamber 20 leading to the casing surrounding the furnace chamber 10, this air flowing through horizontal passages around the combustion chamber 10 and into the combustion chamber through openings 21.

The duct and mingling chamber 20 connects into the duct leading the waste gases to the tubes 13 and the flow of combustion air through the aspirator 19 draws some of these waste gases into the duct and mingling chamber 20 and mingles them with the combustion air. It is advantageous to thoroughly mingle the combustion air with the waste gases in the duct and mingling chamber 20 before they pass into the furnace through the openings 21, to which they are conducted through flues in the side wall of the furnace, as a stratifying action of the air and waste gases in the furnace will be thereby avoided. The waste gases thus carried into the combustion chamber take up some of the heat from the burning gases therein and serve to lower the temperature of the entire mass of gases, while, at the same time, increasing the volume thereof. Moreover, these waste gases, together with the combustion air which is delivered directly into the combustion chamber, receive additional heat from the walls of the combustion chamber to cool the same and to return such heat into the combustion chamber.

By the arrangement described, it will be noted that the flow of combustion air operates the aspirator to draw the waste gases from the waste gas flue. It will also be understood that the combustion air supplied directly to the burner is undiluted, so that the ignition of the fuel in the burner is not interfered with.

If desired, the air heater 13 may be dispensed with, the combustion air being forced directly into the duct 17 in such case and its flow aspirating the waste gases into the duct 20.

A damper 21ª may be provided to regulate the amount of waste gases drawn into the combustion air.

It is advantageous to pass the diluted air through the air ducts of the air cooled wall as compared with an arrangement wherein the diluted air is passed directly into the furnace without first passing through the ducts of the air cooled wall. Should the diluted air be passed directly into the furnace without passing it through the ducts of the air cooled wall or walls, the advantages of air cooling the wall in assisting the maintenance of the wall would not be present, and the furnace would not have the life of a furnace in which the walls are air cooled. With the mixture of the diluted air flowing through the air ducts, the velocity is higher than with the undiluted air, which increases the cooling effect on the furnace walls above what it would be with a lower velocity, and this increase tends to offset any reduction in the cooling of the furnace walls on account of the higher temperature of the mixture of air and gases as compared to the temperature of the air if it were made to flow through the air passageways without dilution.

It will be understood that the arrangement which I have described is illustrative only and that the embodiment of my invention may be widely varied.

I claim:

1. A fluid heater, a furnace therefor, means to supply fuel to said furnace, an air heater to heat combustion air by the furnace gases after they have passed over said fluid heater, ducts to lead some of the heated air to said fuel supplying means, ducts to lead the remainder of said heated air directly into the furnace chamber, and means, including an aspirator operated by the flow of combustion air, to draw some of the waste gases from a point beyond the fluid heater and mingle it with that part of the combustion air flowing directly into the furnace chamber.

2. In a steam boiler and its furnace, means for introducing finely divided fuel into the furnace, means for mixing pure air with said fuel and in an amount insufficient to complete combustion, means for thoroughly mixing air and flue gases externally of the furnace in an amount sufficient to complete combustion, means for passing said mixture of gases over a wall of said furnace to cool the same and means for introducing said mixture to the furnace.

DAVID S. JACOBUS.